United States Patent [19]
Drori

[11] Patent Number: 5,112,481
[45] Date of Patent: May 12, 1992

[54] FILTER SYSTEM HAVING MULTIPLE FILTER ELEMENTS AND BACKFLUSHING ASSEMBLIES

[76] Inventor: Mordeki Drori, 89 Zahal Street, Kiron, Israel

[21] Appl. No.: 420,387

[22] Filed: Oct. 12, 1989

Related U.S. Application Data

[63] Continuation of Ser. No. 245,783, Sep. 16, 1988, Pat. No. 4,923,601.

[30] Foreign Application Priority Data

| Sep. 18, 1987 | [IL] | Israel | 83950 |
| Feb. 24, 1988 | [IL] | Israel | 85543 |
| Aug. 2, 1988 | [IL] | Israel | 87308 |

[51] Int. Cl.$^5$ .................................. B01D 37/02
[52] U.S. Cl. .................... 210/193; 210/359; 210/388; 210/456; 210/459; 210/407
[58] Field of Search ............ 210/193, 332, 388, 777, 210/107, 108, 407, 456, 237, 238, 350, 359, 459

[56] References Cited

U.S. PATENT DOCUMENTS

| 2,066,479 | 1/1937 | Macisaac | 210/193 |
| 2,487,769 | 11/1949 | Ebert et al. | 210/332 |
| 3,042,214 | 7/1962 | Arvanitakis | 210/332 |
| 3,055,290 | 9/1962 | Arvanitakis | 210/332 |
| 3,212,643 | 10/1965 | Schmidt, Jr. et al. | 210/388 |
| 3,272,342 | 9/1966 | McLaren et al. | 210/456 |
| 3,397,793 | 8/1968 | MacDonnell . | |
| 4,120,794 | 10/1978 | Taylor | 210/345 |
| 4,642,182 | 2/1987 | Drori | 210/350 |
| 4,863,598 | 9/1989 | Drori | 210/232 |
| 4,871,457 | 10/1989 | Drori | 210/333.1 |

Primary Examiner—Robert A. Dawson
Assistant Examiner—Joseph Drodge
Attorney, Agent, or Firm—Pearne, Gordon, McCoy & Granger

[57] ABSTRACT

A fluid filter comprising a housing having a central aperture formed in the bottom thereof, a filter element rotatably disposed in the housing and arranged to receive a flow of fluid to be filtered from an upstream side of the element to a downstream side thereof, and a fluid inlet and outlet manifold disposed at the bottom of the housing in communication with the central aperture for providing fluid inlet and outlet communication through said aperture with a fluid inlet and a fluid outlet. The filter element is supplied with filter aid material which is periodically regenerated.

9 Claims, 17 Drawing Sheets

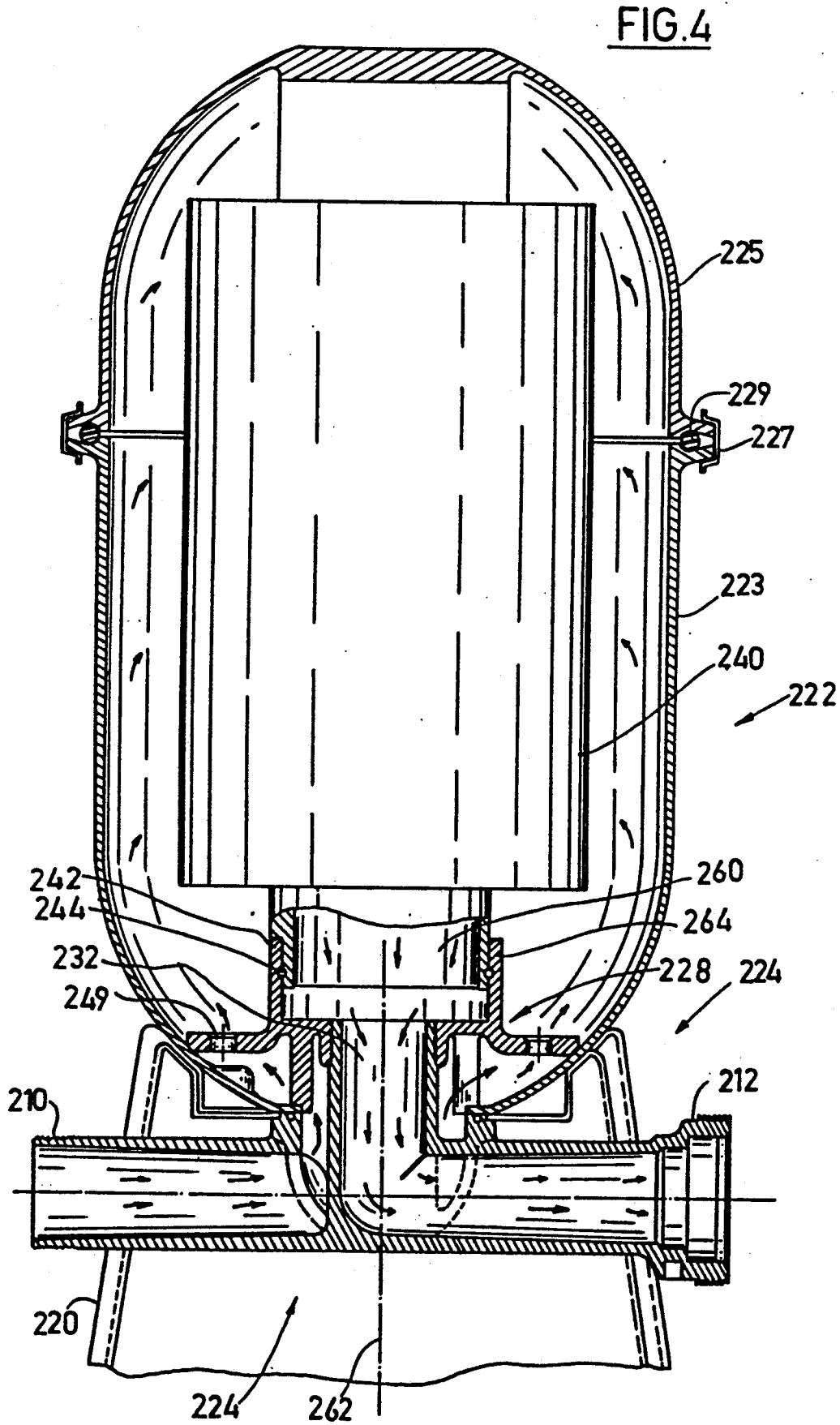

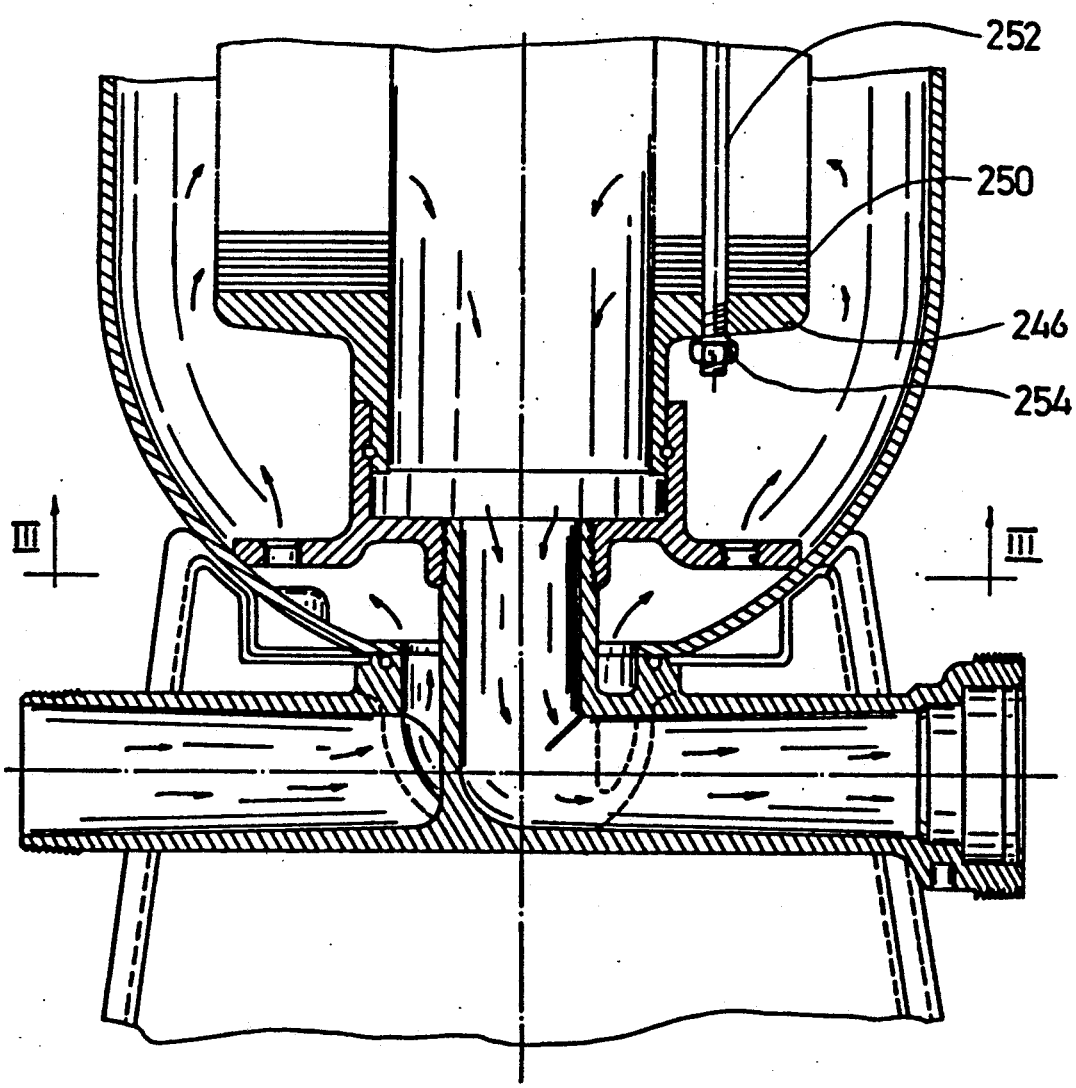

FILTER SYSTEM HAVING MULTIPLE FILTER ELEMENTS AND BACKFLUSHING ASSEMBLIES

This is a continuation of application Ser. No. 07/245,783 filed Sept. 16, 1988 now U.S. Pat. No. 4,923,601.

FIELD OF THE INVENTION

The present invention relates to fluid filters comprising a manifold and more particularly to fluid filters comprising a manifold and employing a filter aid, such as diatomaceous earth or activated carbon, associated with a filter element.

BACKGROUND OF THE INVENTION

Various types of filters are known in the marketplace and in the patent literature.

Back-flushable filters of various types are well known in the art for a great variety of applications. A particularly successful type of backflushable filter employing filter disks is described and claimed in the following patents of applicant: U.S. Pat. Nos. 4,026,806; 4,042,504; 4,045,345; 4,271,018; 4,295,963.

SUMMARY OF THE INVENTION

The present invention seeks to provide a fluid filter which is relatively inexpensive and sturdy, and which incorporates a filter aid material having enhanced regeneration features as compared with the prior art.

There is thus provided in accordance with a preferred embodiment of the present invention a fluid filter comprising a housing having a central aperture formed in the bottom thereof, a filter element disposed in the housing and arranged to receive a flow of fluid to be filtered from an upstream side of the element to a downstream side thereof, and a fluid inlet and outlet manifold disposed at the bottom of the housing in communication with the central aperture for providing fluid inlet and outlet communication through said aperture with a fluid inlet and a fluid outlet.

There is also provided in accordance with a preferred embodiment of the present invention a fluid filter comprising a housing, a filter element disposed in the housing and arranged to receive a flow of fluid to be filtered from an upstream side of the element to a downstream side thereof, a fluid inlet disposed at the bottom of the housing, fluid distributor apparatus associated with the fluid inlet for distributing fluid entering at the fluid inlet about the interior of the housing in communication with the upstream side of the filter element, and a fluid outlet in communication with the downstream side of the filter element.

There is also provided in accordance with a preferred embodiment of the present invention a fluid filter comprising a housing, a filter element disposed in the housing and arranged to receive a flow of fluid to be filtered from an upstream side of the element to a downstream side thereof, a fluid inlet disposed at the bottom of the housing, a fluid outlet in communication with the downstream side of the filter element, and apparatus for causing disengagement of filter aid material associated with said upstream side of said filter element so as to enable regeneration of said filter aid material.

In accordance with a preferred embodiment of the invention, there is also provided fluid distributor apparatus associated with the fluid inlet and outlet manifold for distributing fluid entering at the fluid inlet about the interior of the housing in communication with the upstream side of the filter element.

Further in accordance with a preferred embodiment of the invention, the manifold also defines a fluid outlet path communicating between the downstream side of the filter element and the fluid outlet via said central aperture and said inlet and outlet manifold.

In accordance with a preferred embodiment of the present invention, the fluid inlet and the fluid outlet are integrally formed in said inlet and outlet manifold.

Further in accordance with a preferred embodiment of the invention, the fluid distributor apparatus is threadably engaged with the inlet and outlet manifold.

In accordance with a preferred embodiment of the invention, the engagement of the fluid distributor apparatus with the inlet and outlet manifold provides sealing engagement with the housing.

Further in accordance with a preferred embodiment of the invention, the engagement of the fluid distributor apparatus with the inlet and outlet manifold provides centering of the inlet and outlet manifold and of the distributor apparatus with respect to the housing.

Further in accordance with a preferred embodiment of the invention, the fluid distributor apparatus comprises a plurality of distributed upstanding members which define a plurality of azimuthally distributed pathways for fluid entering the housing.

Additionally in accordance with a preferred embodiment of the invention, the plurality of upstanding members define surfaces which engage the housing adjacent the central aperture.

Further in accordance with the foregoing preferred embodiment of the invention, the inlet and outlet manifold defines a surface which engages the housing adjacent the central aperture opposite to the plurality of upstanding members for pressure engagement with the housing thereat.

Additionally in accordance with a preferred embodiment of the invention, the engagement of the upstanding members and of the inlet and outlet manifold surface with the housing adjacent the central aperture provides centering of the inlet and outlet manifold and of the distributor apparatus with respect to the housing.

Further in accordance with a preferred embodiment of the invention, the fluid distributor apparatus comprises a distributor plate which defines a plurality of azimuthally distributed apertures for fluid entering the housing.

Additionally in accordance with a preferred embodiment of the invention, the distributor plate is disposed downstream of the plurality of upstanding members.

Further in accordance with an embodiment of the invention, the distributor plate engages the interior of the housing at a location spaced from the central aperture.

In accordance with the aforesaid embodiment of the invention, the inlet and outlet manifold defines a surface which engages the housing adjacent to the central aperture for sealing engagement with the housing adjacent to the central aperture.

Additionally in accordance with a preferred embodiment of the invention, the engagement of the distributor member and of the inlet and outlet manifold surface with the housing provides centering of the inlet and outlet manifold and of the distributor apparatus with respect to the housing.

Further in accordance with a preferred embodiment of the present invention, the threaded engagement of the distributor apparatus and of the inlet and outlet manifold surface provides engagement of the distributor plate and of the upstanding members with the interior of the housing and pressure engagement of a surface of the inlet and outlet manifold with the exterior of the housing, thus providing sealing engagement between the distributor apparatus, the inlet and outlet manifold and the housing, mutual centering thereof and rigid coupling therebetween.

Additionally in accordance with a preferred embodiment of the present invention, the fluid distributor apparatus defines a valve support.

There is also provided in accordance with a preferred embodiment of the invention a manifold defining at least one integrally formed fluid passage conduit and comprising a one way valve located within the integrally formed fluid passage conduit.

In accordance with one embodiment of the invention, the at least one integrally formed fluid passage conduit includes an inlet conduit and the one way valve is located therein.

In accordance with an embodiment of the invention, the at least one integrally formed fluid passage conduit comprises a plurality of conduits and one way valves may be located within one or more of such conduits.

BRIEF DESCRIPTION OF THE DRAWINGS

The present invention will be understood and appreciated more fully from the following detailed description, taken in conjunction with the drawings in which:

FIG. 4 is a side sectional illustration of a filter constructed and operative in accordance with a preferred embodiment of the present invention;

FIG. 7A is a detailed sectional illustration similar to that of FIG. 5B but showing a disk type filter element;

DETAILED DESCRIPTION OF PREFERRED EMBODIMENTS

Figure 1A:
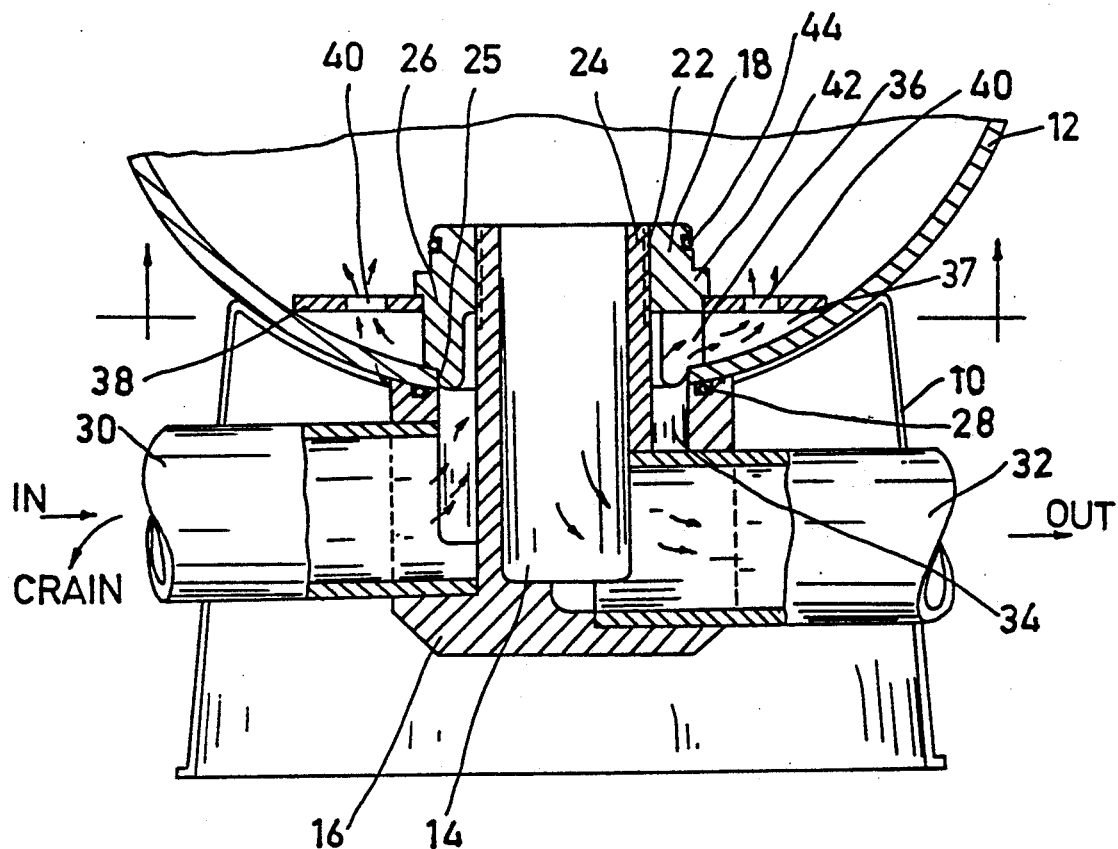
FIG. 1A is a detailed sectional illustration of an inlet and outlet assembly for a filter housing constructed and operative in accordance with a preferred embodiment of the present invention.
Figure 1B:
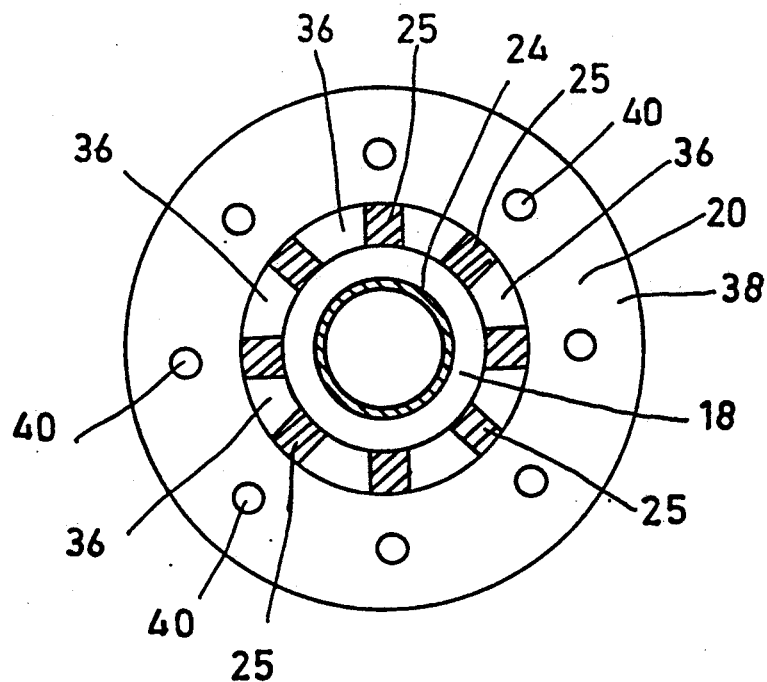
FIG. 1B is a sectional illustration taken along the lines B—B in FIG. 1A.

Reference is now made to FIGS. 1A and 1B, which illustrate an inlet and outlet assembly for a filter housing in accordance with a preferred embodiment of the present invention. As seen in FIG. 1A, the filter comprises a support base 10 which supports a filter housing 12 having a central bottom aperture 14. A manifold 16 is sealingly mounted onto filter housing 12 at aperture 14 by means of a threaded deflector collar member 18, which engages external threadings 22 formed onto a central hollow shaft portion 24 of manifold 16.

Deflector collar member 18 is formed with a plurality of ribs 25, which define peripheral shoulders 26 which engage the corresponding peripheral rim defined in the filter housing 12 about aperture 14. A peripheral sealing ring 28 is pressed between the manifold 16 and the underside of the filter housing 12 about aperture 14.

An inlet pipe 30 and an outlet pipe 32 are each fixedly disposed in operative association with the manifold. The inlet pipe 30 communicates with an annular conduit 34 which surrounds shaft portion 24.

The annular outlet of conduit 34 communicates via passages 36 defined between ribs 25 with an annular volume 37 that underlies a distributor plate 38. Distributor plate 38 is typically fixedly mounted onto collar member 18 and is arranged to separate volume 37 from the remainder of the interior of the filter housing 12. Distributor plate 38 is formed with a plurality of apertures 40 generally evenly azimuthally distributed thereon, so as to permit exit of fluid from volume 37 in a distributed manner over the entire 360 degrees of azimuth defined thereby. The fluid exiting from volume 37 via apertures 40 communicates with the upstream side of a filter element (not shown) located within filter housing 12. The arrangement of the filter element in the filter housing 12 is illustrated inter alia in FIGS. 2-6.

The interior of the hollow shaft portion 24 communicates with the downstream side of the filter element (not shown in FIG. 1), in a manner shown inter alia in FIGS. 2-6. Outlet pipe 32 communicates directly with the interior of the hollow shaft portion 24.

Deflector collar member 18 is formed with a support shoulder 42 and is provided with a sealing ring 44 for sealingly mounting of a filter element (not shown) thereon.

It may be appreciated that when joined as described hereinabove, filter housing 12, manifold 16 and deflector collar member 18 operate as a single unit, as if integrally formed. Alternatively the entire inlet and outlet assembly may be integrally formed.

The operation of the apparatus shown in FIGS. 1A and 1B will now be summarized. A fluid, such as water, enters through inlet pipe 30 and flows upwardly through annular conduit 34, defined by manifold 16. The water flows out through passages 36 defined by deflector collar member 18 and enters volume 37. The water is distributed about the azimuth of the filter by distributor 38, which causes it to pass through apertures 40, formed therein. The water then passes through the filter element (not shown in FIG. 1) from the upstream side thereof to the downstream side thereof. From the downstream side, the filtered water passes through the interior of the hollow shaft portion 24 of the manifold 16 and then out the outlet pipe 32.

Figure 2:
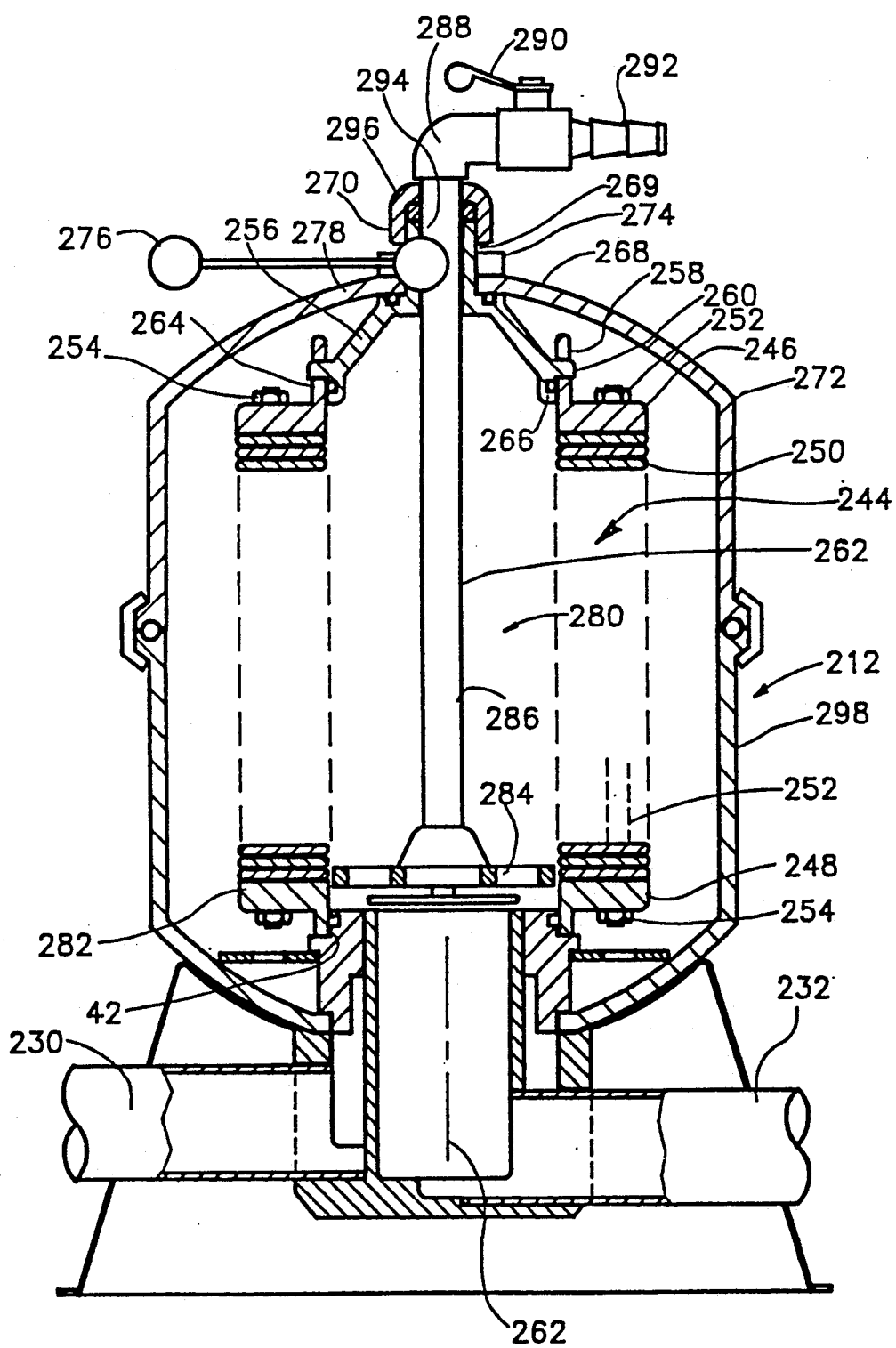
FIG. 2 is a side sectional illustration of a fluid filter constructed and operative in accordance with an embodiment of the present invention and including a handle for enabling rotation of the filter element and a backflushing nozzle.

Reference is now made to FIG. 2, which illustrates a fluid filter constructed and operative in accordance with a preferred embodiment of the present invention.

A filter element 244, such as a disc filter element of the type described in Israel Patent Application No. 83330, the disclosure of which is incorporated herein by reference, is seated on and supported by support shoulder 42 (FIG. 1) defined by deflector collar member 218. It is particularly noted that support shoulder 42 provides a rotatable support for filter element 244, permitting rotation thereof relative to deflector collar member 218.

Filter element 244 is defined by top and bottom securing elements 246 and 248, which lie at respective top and bottom ends of a stack 250 of filter disks. The filter element 244 is held together tightly by a plurality of axial bolts 252 which are secured by suitable nuts 254 adjacent respective top and bottom securing elements. Filter disks are preferably of the type described in Israel Patent Application 83330, the disclosure of which is incorporated herein by reference.

Bottom securing element 248 is seated onto shoulder 42, while top securing element 246 sealingly engages a rotatable mounting yoke 256, which supports and stabilizes the filter element 244 from above. The engagement between top securing element 246 and rotatable mounting yoke 256 includes the provision of axial protrusions 258 on top securing element 246, which engage radially extending protrusions 260 formed onto yoke 256, such that the rotation of yoke 256 about a central axis 262 produces rotation of top securing element 246 and thus of the entire filter element about axis 262. Yoke 256 also defines a shoulder 264 which locates top securing element 246 axially and a peripheral inner positioning surface 266, which locates the top securing element 246 radially with respect to axis 262. A sealing ring 268 is preferably associated with surface 266 for providing sealing between element 246 and yoke 256.

Rotatable yoke 256 is integrally formed with a neck portion 269, which extends upwardly through a central top aperture 270 formed in a top portion 272 of the filter housing. Rotatable yoke 256 is removably sealingly mounted onto top portion 272 by means of a collar member 274, which threadably engages neck portion 269 and which is formed with a handle 276. When collar member 274 is tightly threaded onto neck portion 269, an upper surface 278 of yoke 256 is disposed in rotatable sealing engagement with the top portion 272 of the filter housing about aperture 270, such that rotation of the handle in either direction produces corresponding rotation of yoke 256. Rotation of yoke 256 results in rotation of filter element 244 due to the interdigitation of protrusions 258 and 260 as described above.

A rotating backflush jet assembly 280 including a rotating nozzle 282, an apertured positioning element 284, a support and supply pipe 286, an angled top portion 288, a water supply valve 290 and a connector 292 to a flexible water supply hose 294, is selectably slidably mounted about central axis 262 and extends through a bore 294 formed in yoke 256. Jet assembly 280 is selectably secured to neck portion 269 by means of a rubber ring seal which can be pressed inwardly to frictionally engage pipe 286 by tightening of a cap screw 296 thereover in threaded engagement with neck portion 269.

The operation of the apparatus of FIG. 2 will now be summarized. Water to be filtered passes through the inlet and outlet assembly from the upstream side of the filter element 244 to the downstream side thereof and out through outlet pipe 232. Upon termination of the flow of water to be filtered into the filter, such as upon termination of the operation of a pump which produces the flow, an operator rotates handle 276 about axis 262 in either a continuous motion or a back and forth motion, thus causing rotation of the filter element 244 relative to the water contained therein. This relative rotation causes disengagement of filter aid material from the upstream surface of the filter element, such that such filter aid material falls to the bottom of the upstream volume of the filter, interior of a bottom portion 298 of filter housing 212.

Renewed supply of water to the filter via inlet pipe 230, the deflector and the distributor causes the filter aid material to be redistributed over the upstream surface of the filter element and thus be effectively regenerated, significantly extending its useful operating lifetime.

Figure 3:
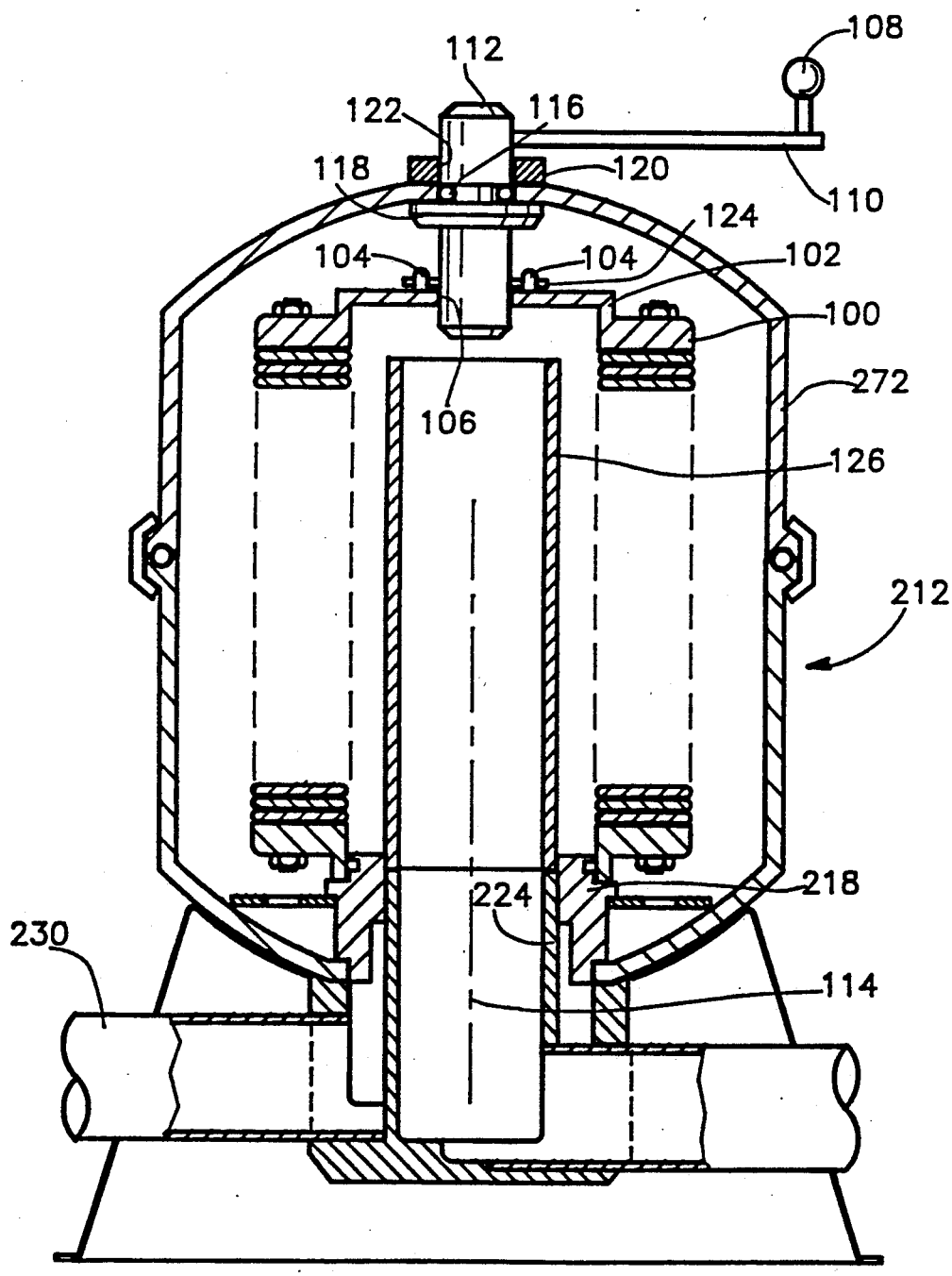
FIG. 3 is a side sectional illustration of a fluid filter constructed and operative in accordance with another embodiment of the present invention and including a handle for enabling rotation of the filter element and an elevated outlet conduit.

Reference is now made to FIG. 3, which shows an alternative embodiment of filter, which is similar to that of FIG. 2, but does not include a backflush nozzle assembly. Here, the inlet and outlet assembly may be identical to that of FIG. 2, as may be the filter element 244. In constrast to the embodiment of FIG. 2, here the top securing element 100 may be integrally formed with a rotatable yoke 102. Yoke 102 is preferably formed with a pair of spaced upstanding protrusions 104 disposed on either side of a central aperture 106.

A handle 108 is rotatably mounted via an arm 110 for rotation on an axle 112, which is arranged along a longitudinal axis 114 of the filter. Axle 112 sealingly and rotatably extends through a central aperture 116 formed about axis 114 in top cover portion 272 of the filter housing 212. Axle 112 is secured in position axially by means of an integrally formed bottom abutment member 118 disposed below top cover portion 272 and of a threaded nut 120, disposed above top cover portion 272. An O ring 122 is disposed between the axle 112 and the top cover portion 272 to prevent escape of fluid from the filter housing.

Axle 112 extends downwardly and through central aperture 106 of yoke 102 in sealing engagement therewith. Extending transversely through axle 112 just above yoke 102 and in driving engagement with upstanding protrusions 104 is a drive member 124, which upon rotation of handle 108 and axle 112, produces rotation of the yoke 102 and thus of the filter element 244 about axis 114.

It will be noted that in the embodiment of FIG. 3, an upward continuation of the hollow shaft portion 224 is defined by the addition of a central outlet pipe 126 in the downstream region interior of the filter element 244 and axially centered about axis 114. Central outlet pipe 126 is threadably mounted at its bottom portion onto distributor collar member 218 so as to define an extension of the hollow shaft portion 224 and terminates just below the top of the filter element. This arrangement ensures that upon termination of the supply of water to inlet 230, the filter housing 212 will remain full of water up to the top of central outlet pipe 126.

Operation of the apparatus of FIG. 3 is identical to that of FIG. 2, with the exception that backflushing is not provided. Thus, when it is desired to remove the filter aid and clean the filter element, the housing 212 must be opened and the filter element removed for backflushing as by the type of nozzle shown in FIG. 2.

Figure 5A:
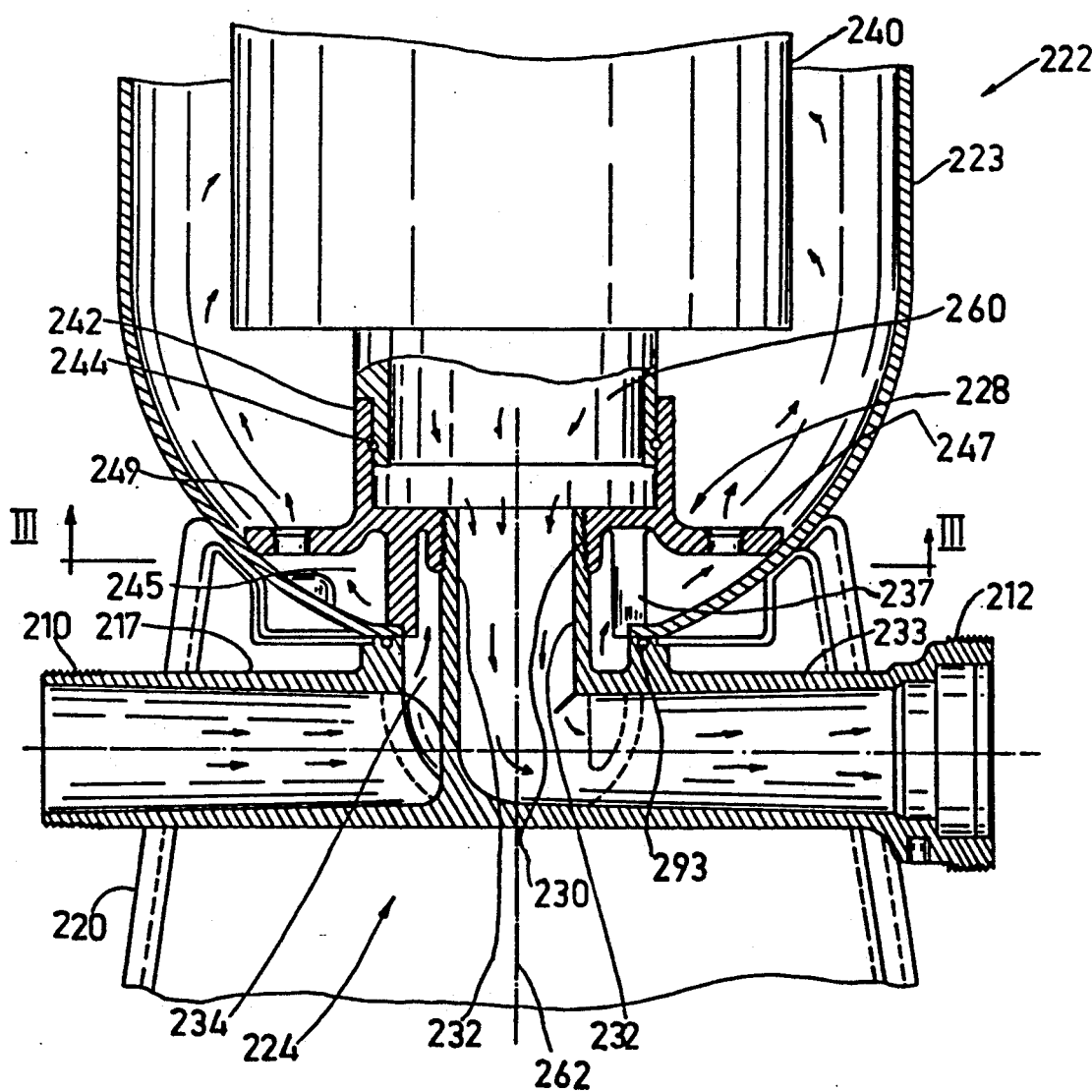
FIG. 5A is a detailed sectional illustration of an inlet and outlet assembly forming part of the filter shown in FIG. 4.
Figure 6A:
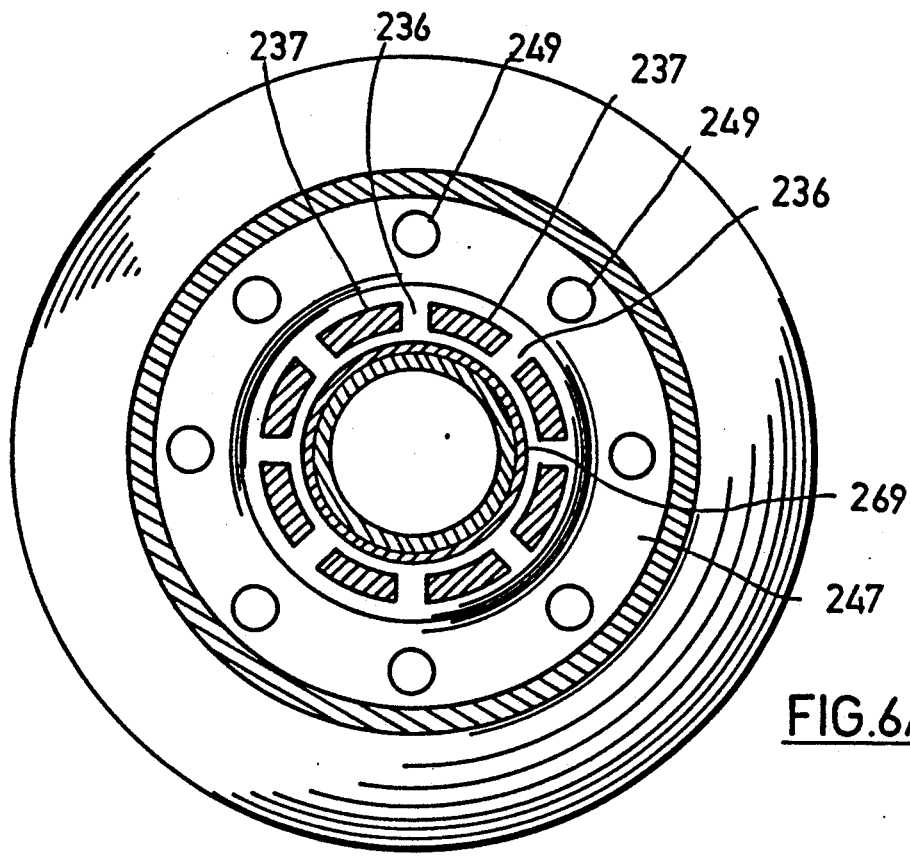
FIG. 6A is a detailed sectional illustration of part of the inlet and outlet assembly of FIGS. 4 and 5A taken along the lines III—III therein.

Reference is now made to FIGS. 4, 5A and 6A, which illustrate a fluid filter constructed and operative in accordance with a preferred embodiment of the present invention and including an inlet 210 connected to a pressurized supply of fluid to be filtered, such as water, as from a pump (not shown), and an outlet 212.

As seen in FIGS. 4 and 5A, the filter comprises a support base 220 which supports a filter housing 222 which is is associated with an inlet and outlet manifold 224, which defines inlet 210 and outlet 212. Filter housing 222 is formed of a bottom part 223 and a top part 225 which are joined by an external sealing ring 227 and associated O-ring 229.

A threaded distributor member 228 is threadably mounted onto manifold 224 and engages external threadings 230 formed onto a central hollow shaft portion 232 of manifold 224.

An inlet pipe 217 and an outlet pipe 233 are integrally formed with the manifold 224. The inlet pipe 217 communicates with an annular conduit 234 which surrounds shaft portion 232, while the outlet pipe 233 communicates with the interior of shaft portion 232.

A filter element 240, of any suitable type, such as a disk filter element of the type described in Israel Patent Application No. 83330, the disclosure of which is incorporated herein by reference, a cartridge filter or any other suitable filter element of conventional construction, is seated on and supported by a support shoulder 242 defined by distributor member 228 and sealed with respect thereto by a sealing ring 244.

Filter element 240 defines an exterior upstream surface and an interior downstream surface and divides the interior of the filter housing 222 into an upstream side which communicates with the exterior surface of the filter element and a downstream side which communicates with the interior surface of the filter element. Alternatively the upstream-downstream arrangement may be reversed.

According to a preferred embodiment of the invention, filter aid material is associated with the upstream surface of the filter element 240. The filter aid material may be diatomaceous earth, activated carbon or any other suitable filter aid material in any form, such as a filter cake.

The annular conduit 234 communicates with the upstream side of the interior of the housing 222 via a plurality of radially extending passages 236 (FIG. 6A) defined between spaced upstanding portions 237 of distributor member 228. Passages 236 are generally evenly azimuthally distributed thereon, so as to permit generally uniform azimuthal distribution of water supplied to the upstream side of the interior of the filter housing.

Water passing through passages 236 enters an annular volume 245 which is delimited from the remainder of the interior of the upstream side by a distributor plate 247 having a plurality of generally evenly distributed apertures 249, through which water exits into the remainder of the upstream side of the interior of the filter housing in a distributed manner over the entire 360 degrees of azimuth defined by the distributor plate.

It is noted that any other backflushable or non-backflushable filter elements may be employed in the invention instead of filter disks.

Filter element 240 is formed with a hollow axial bore 260 which extends along a longitudinal axis 262 and is surrounded by the downstream surface of the filter element. The interior of the hollow shaft portion 232 communicates with the downstream side of the filter element via axial bore 260.

The operation of the apparatus shown in FIGS. 4, 5A and 6 will now be summarized. During normal filtering operation, in the operative arrangement shown in FIG. 4, a fluid, such as water, pressurized by a pump (not shown), enters through inlet 210 and passes through inlet pipe 217.

The water flows into manifold 224 and flows upwardly through annular conduit 234 and passages 236 defined by distributor member 228 and enters the upstream side of filter element 240. The water to be filtered then passes through the filter element 240, on the upstream side of which may be provided a filter aid, such as diatomaceous earth or activated carbon, normally in the form of a filter cake, onto which particulate matter filtered out of the water is collected.

The filtered water passes out through the downstream side of the filter element 240 into hollow bore 260 and passes to the interior of shaft portion 232 and out through outlet pipe 233 to outlet 212.

The above described operation is characteristic of normal filtering and the water flows are indicated by the arrows in the drawing. In this operation, particulate material is filtered out of the water and collects on a filter cake at the upstream side of the filter element 240.

Referring now particularly to FIG. 5A it is seen that the distributor member 228 is integrally formed and includes the distributor plate 247 as well as upstanding members 237 which sealingly engage the housing bottom portion 223 between the distributor member 228 and the manifold 224, with the aid of an O-ring 293, by means of threaded engagement between the threading 230 on shaft portion 232 and the corresponding threading on the distributor member 228.

Figure 5B:
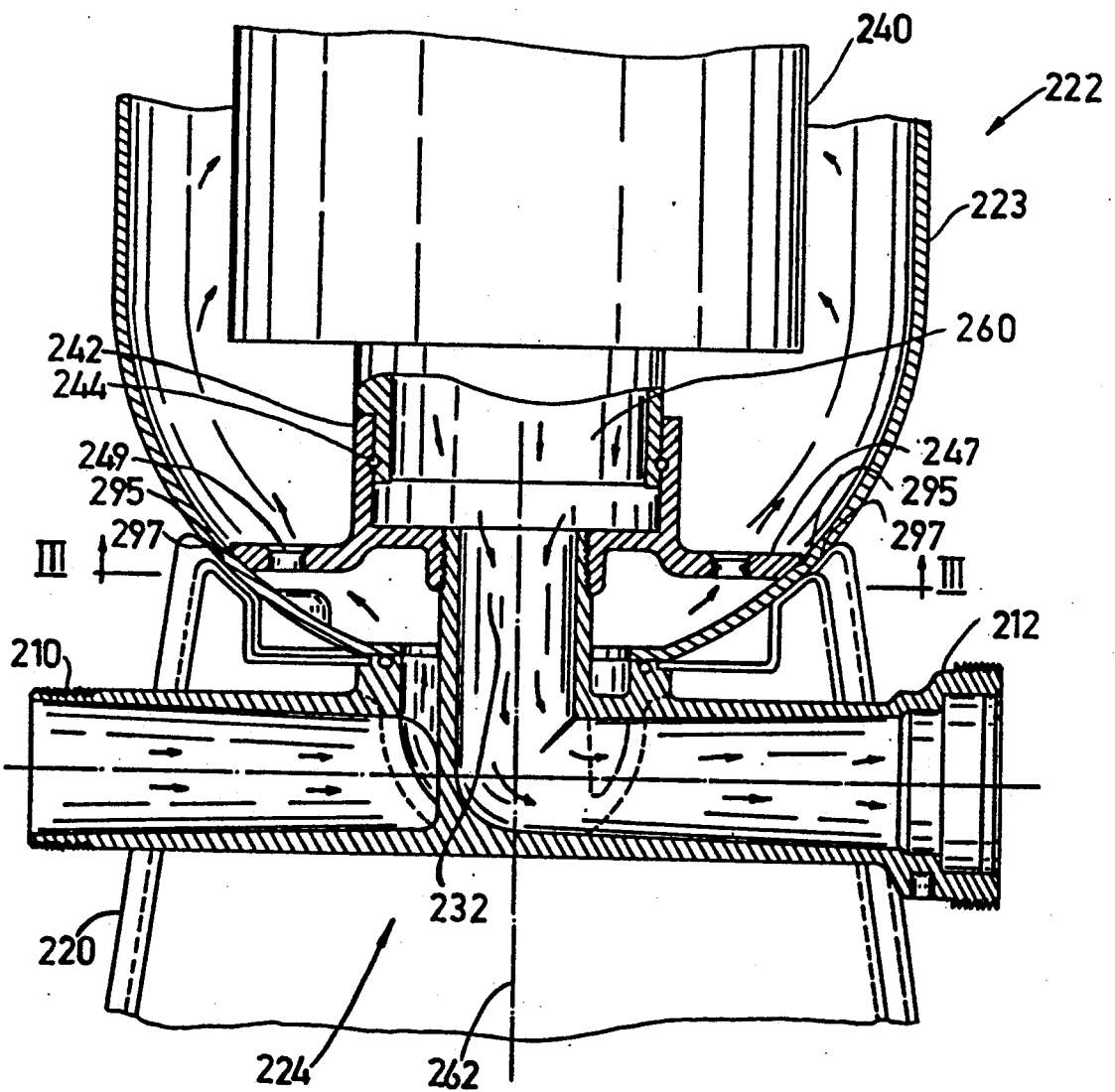
FIG. 5B is a detailed sectional illustration of an alternative embodiment of an inlet and outlet assembly useful in the filter shown in FIG. 4.
Figure 6B:
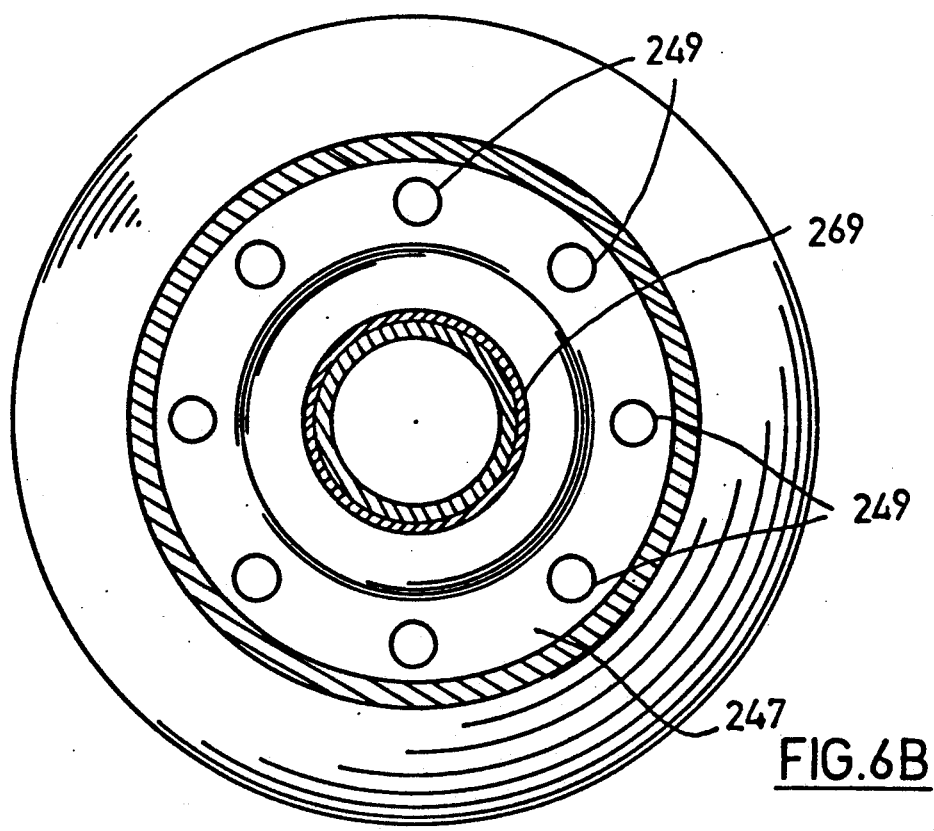
FIG. 6B is a detailed sectional illustration of part of the inlet and outlet assembly of FIG. 5B taken along the lines III—III therein.

According to an alternative embodiment of the invention, illustrated in FIGS. 5B and 6B, the upstanding members 237 are omitted. In this embodiment, a tapered peripheral edge 295 of the distributor plate 247 forces the housing bottom portion 223 against a corresponding support surface 297 defined by support base 220. The remainder of the structure may be the same as shown in FIGS. 5A and 6A.

Figure 5C:
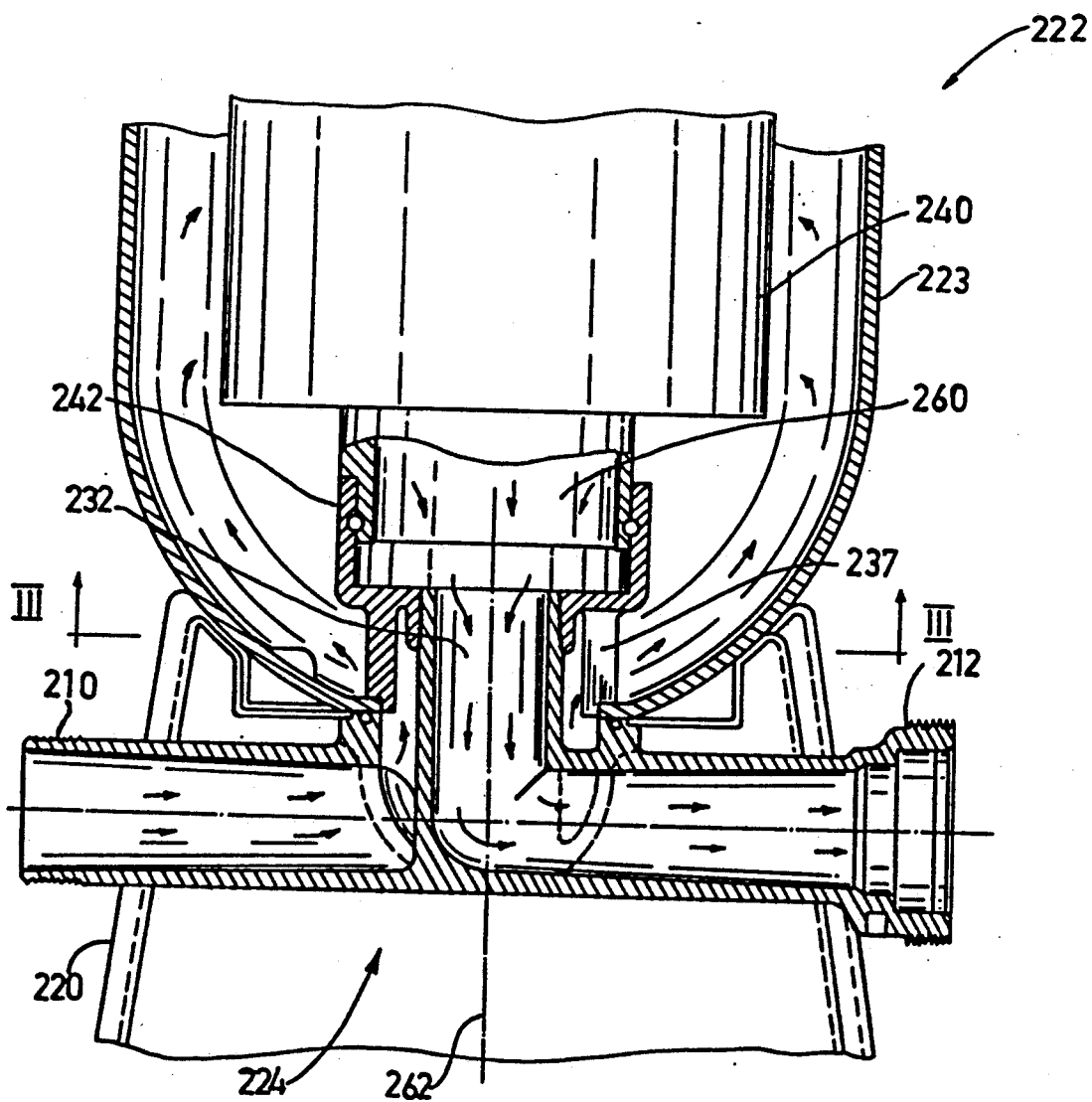
FIG. 5C is a detailed sectional illustration of a further alternative embodiment of an inlet and outlet assembly useful in the filter shown in FIG. 4.
Figure 6C:
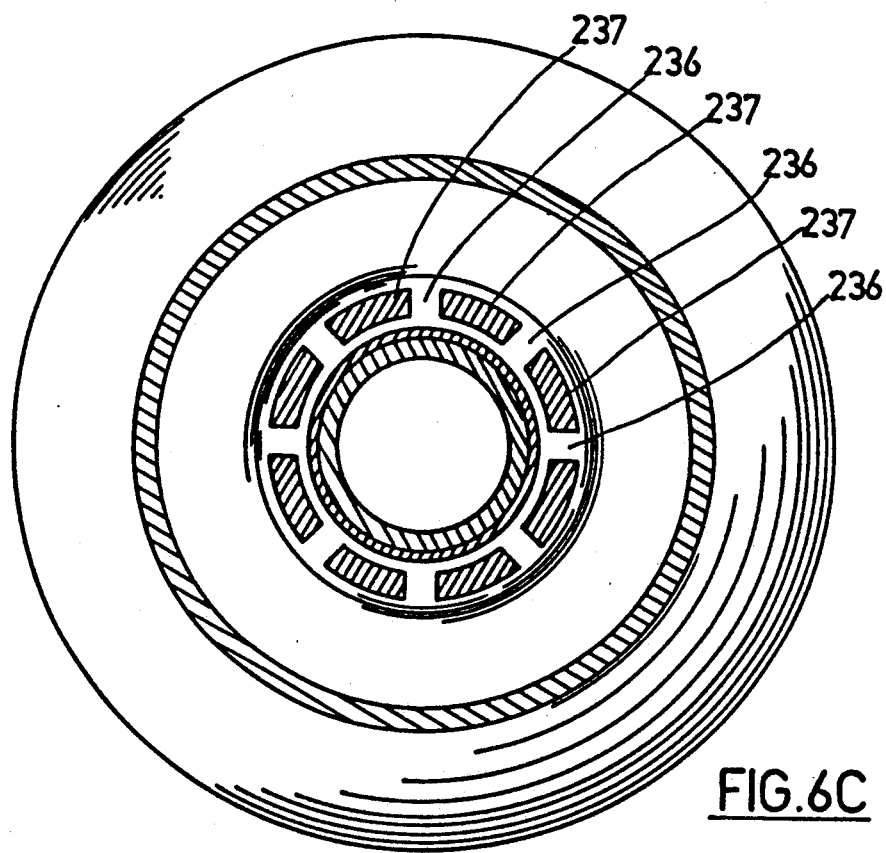
FIG. 6C is a detailed sectional illustration of part of the inlet and outlet assembly of FIG. 5C taken along the lines III—III therein.

A further alternative embodiment of the invention is illustrated in FIGS. 5C and 6C. Here the upstanding members 237 are retained and the distributor plate 247 is eliminated. The remainder of the structure may be the same as shown in FIGS. 5A and 6A.

Reference is now made to FIG. 7A which illustrates an embodiment essentially identical to that shown in FIG. 5B wherein the filter element 240 is shown to be a disk filter.

Filter element 240 is typically defined by top (not shown) and bottom securing elements 246, which lie at respective top and bottom ends of a stack 250 of filter disks. The filter element 240 is held together tightly by a plurality of axial bolts 252 which are secured by suitable nuts 254 adjacent respective top and bottom securing elements. Filter disks are preferably of the type described in Israel Patent Application 83330, the disclosure of which is incorporated herein by reference.

Figure 7B:
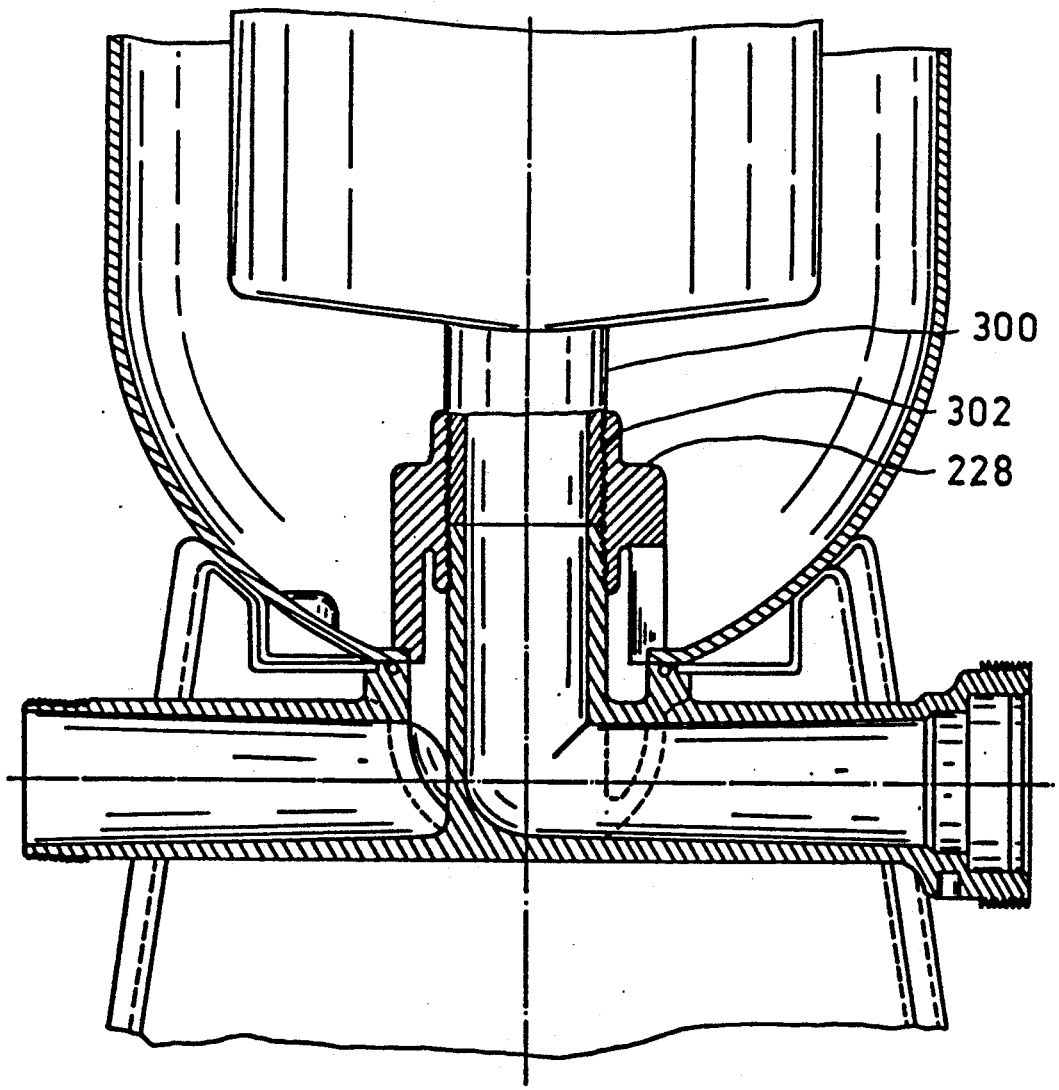
FIG. 7B is a detailed sectional illustration similar to that of FIG. 5A but showing a different configuration of filter element.

Reference is now made to FIG. 7B which shows structure essentially identical to that of FIG. 5A wherein the filter element includes a depending downstream pipe 300 which threadably engages the distributor member 228 at threadings 302.

Figure 8:
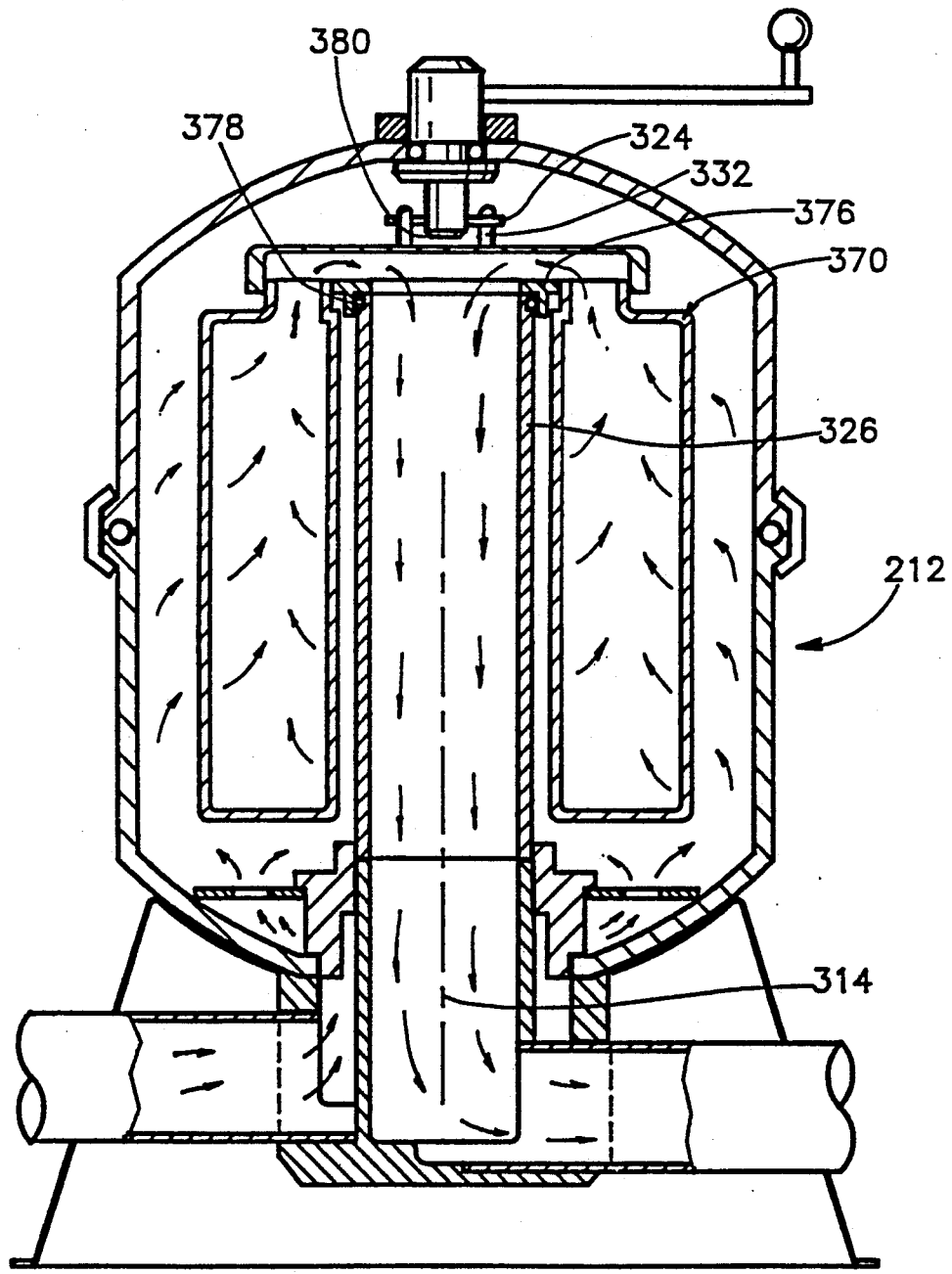
FIG. 8 is a side view illustration of a fluid filter similar to that of FIG. 3 but having a different type of filter element.

Reference is now made to FIG. 8 which illustrates a further alternative embodiment of the present invention, employing a conventional non-disc filter element, such as that manufactured and sold by PAC-FAB.

The arrangement of the inlet and outlet assembly and of the handle may be identical to that shown in FIG. 3. Here, however, the yoke is replaced by an integrally formed filter element 370 including a central portion 372 and outwardly extending portions 374. Filter element 370 is rotatably supported onto the top rim 376 of outlet pipe 326 and defines a circular peripheral positioning shoulder 378 which serves to center the filter element 370 about central axis 314.

Rotation of the filter element 370 with respect to the filter housing 212 is provided by means of a pair of upstanding protrusions 380 and 382, which are drivingly engaged by transverse driving rod 324, as described hereinabove in connection with FIG. 3. The operation of the filter element 370 and particularly the regeneration of the filter aid material adhering to the upstream side of the filter element 370 in response to rotation of the filter element is essentially the same as described hereinabove in connection with FIG. 3.

Figure 9:
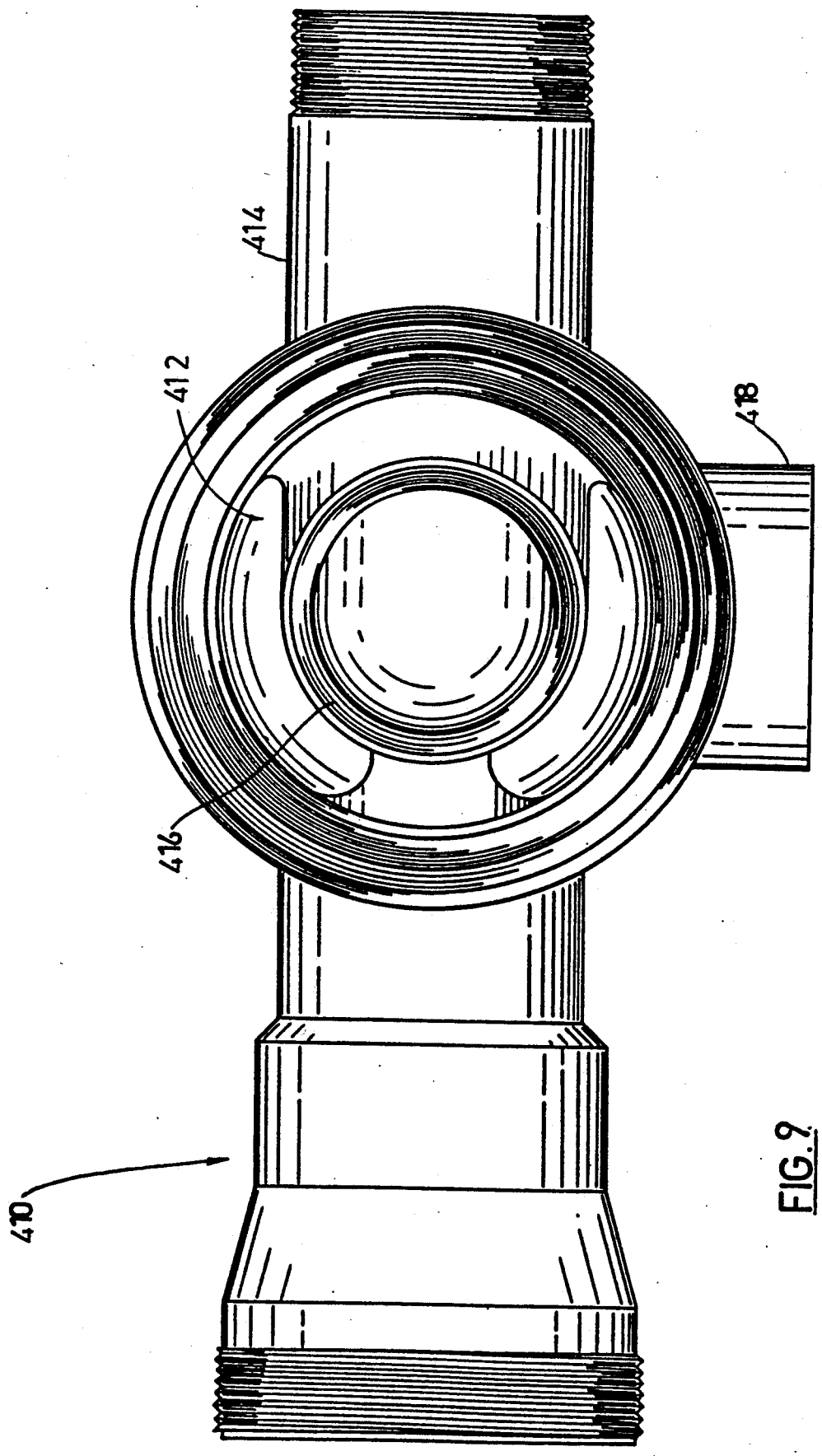
FIG. 9 is a top view illustration of manifold apparatus constructed and operative in accordance with a preferred embodiment of the present invention.
Figure 10:
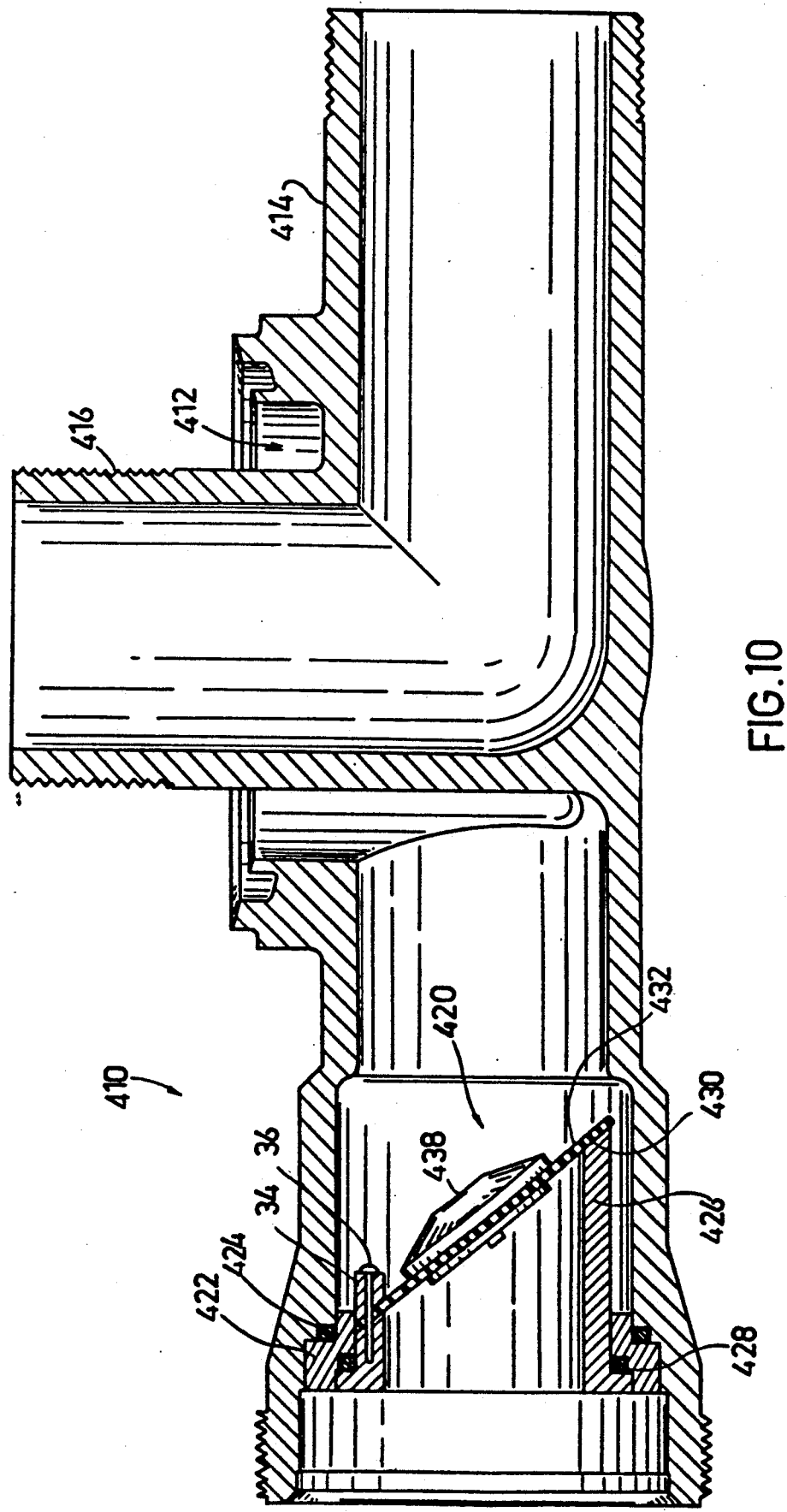
FIG. 10 is a side view illustration of the manifold apparatus of FIG. 9 wherein the one way valve is in a closed orientation.
Figure 11:
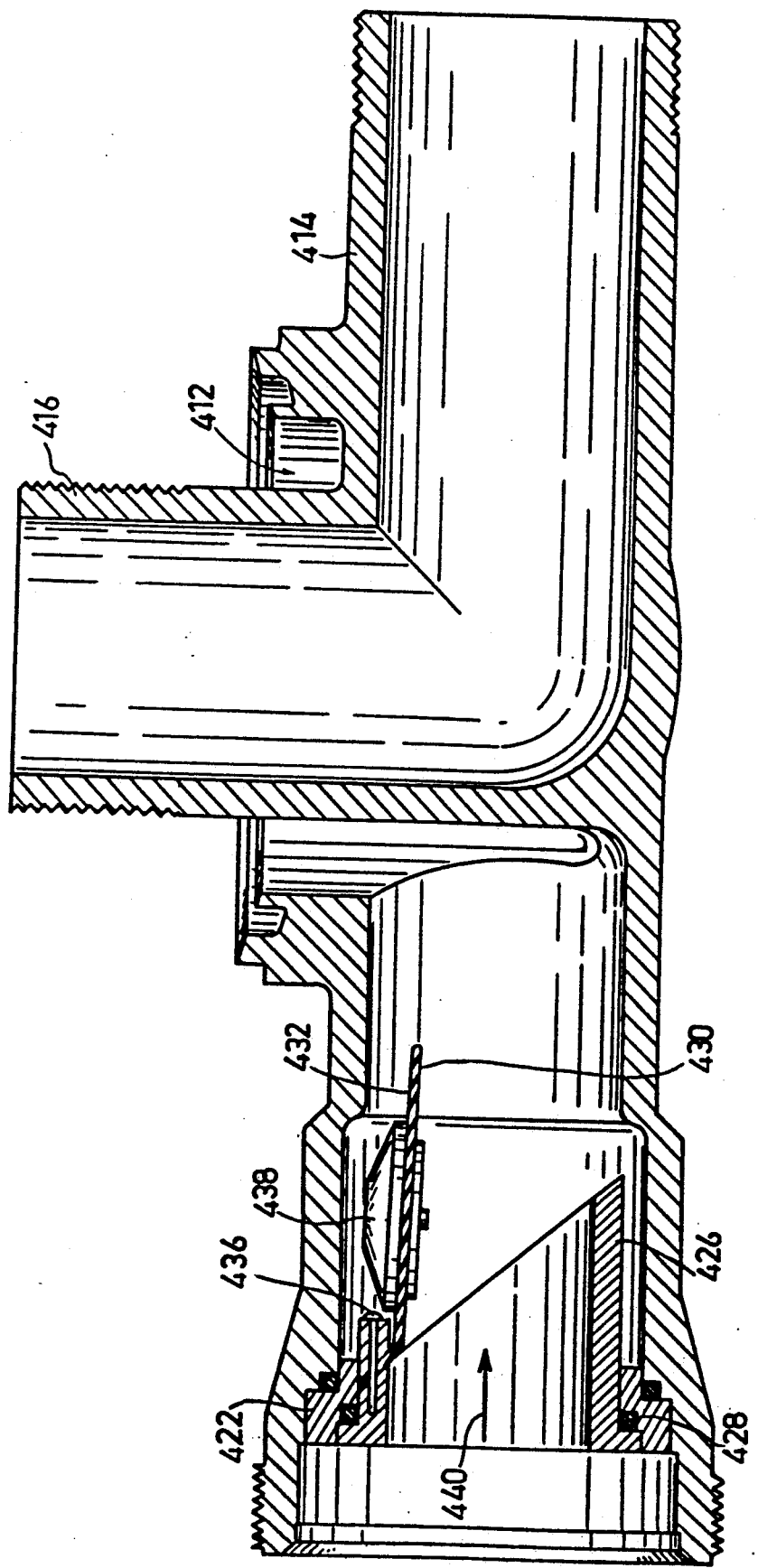
FIG. 11 is a side view illustration of the manifold apparatus of FIG. 9 wherein the one way valve is in an open orientation.

Reference is now made to FIGS. 9–11 which illustrate manifold apparatus constructed and operative in accordance with a preferred embodiment of the present invention. It will be appreciated that although the invention will be described hereinbelow in the context of a manifold particularly suited for use with a fluid filter, the invention is not so limited and applies to any suitable type of manifold apparatus.

FIGS. 9–11 illustrate a manifold which is integrally formed of a plastic material, such as PVC, and is particularly suitable for use with a fluid filter, as described in Israel Patent Applications 85543 and 83950 the disclosure of which is incorporated herein by reference.

The manifold comprises an inlet fluid conduit 410 which communicates with an inlet port 412, which is arranged for engagement and communication with the interior of a fluid filter (not shown). The manifold also comprises an outlet fluid conduit 414 which communicates with an outlet port 416, which in the illustrated embodiment is arranged interior of and concentric with the inlet port 412. A drain conduit 418 may be provided to communicate with the inlet port 412.

In accordance with a preferred embodiment of the present invention there is disposed interior of the integrally formed inlet conduit 410 a one-way valve assembly 420 (FIG. 10). In the illustrated embodiment, the inlet conduit 410 is somewhat broadened to accomodate the one way valve assembly, but this need not be the case.

In the embodiment of FIGS. 10 and 11, the one way valve comprises a stepped intermediate sleeve member 422 which is sealed with respect to the inlet conduit 410 via an O-ring 424 and a valve seat 426 which is sealingly seated onto sleeve member 422 via an O-ring 428. Valve seat 426 is typically configured as a diagonally cut circular pipe, so as to present a generally elliptical valve seat surface 430.

A hinged flap 432 is mounted onto valve seat 426, typically at a top end thereof, and is secured by means of a securing member 434, which is attached to the valve seat 426, as by screws 436. A weight 438 may be associated with the flap 432 to maintain the flap 432 in sealing engagement with seating surface 430 in the absence of inward liquid flow through conduit 410. The hinged flap 432 may simply be formed of a flexible material, such as reinforced rubber, or alternatively may comprise a relatively rigid material, such as plastic, which is provided with a suitable hinge just below securing member 434.

FIG. 10 illustrates the one-way valve in a closed orientation, while FIG. 11 illustrates the one-way valve in an open orientation in response to fluid flow through conduit 410 in a direction indicated by an arrow 440.

Figure 12:
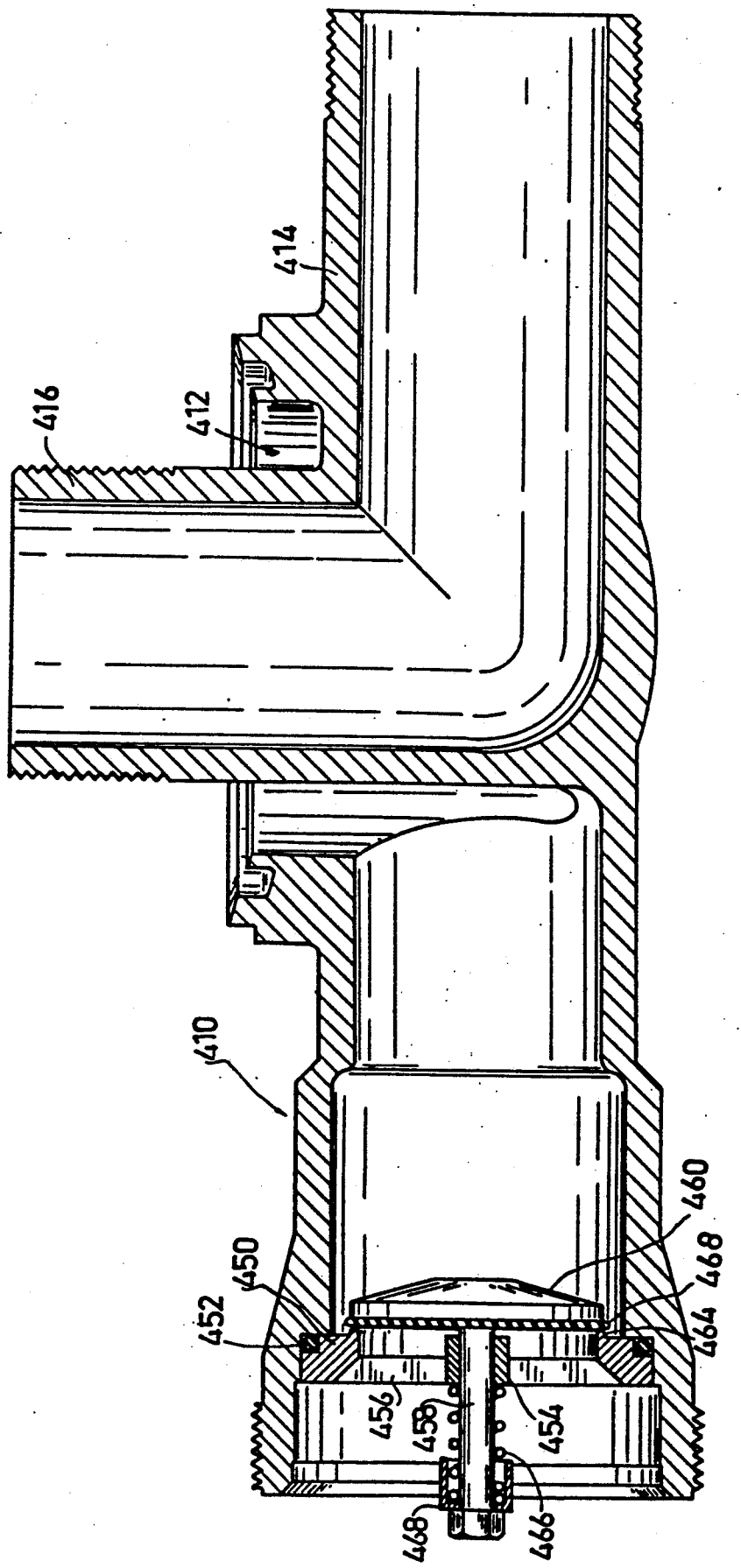
FIG. 12 is a side view illustration of the manifold apparatus of FIG. 9 having a different type of one way valve and wherein the way valve is in a closed orientation.
Figure 13:
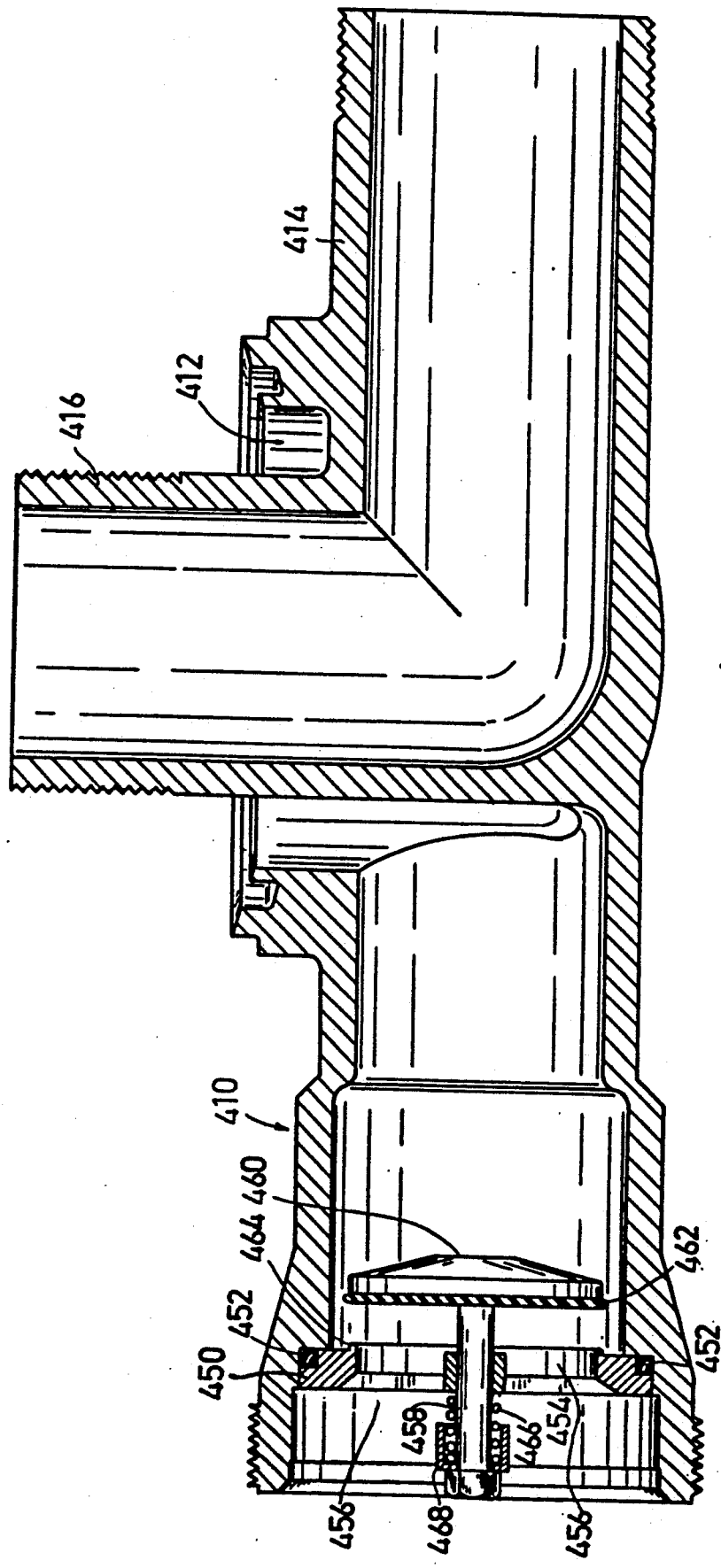
FIG. 13 is a side view illustration of the manifold apparatus of FIG. 9 having a different type of one way valve and wherein the one way valve is in an open orientation.

Reference is now made to FIGS. 12 and 13, which illustrate an alternative embodiment of the present invention wherein a different type of one-way valve is provided. Here the one way valve comprises an annular valve seat 450 sealingly disposed within conduit 410 via an O-ring 452. Slidingly disposed for axial movement relative to a collar member 454 which is fixed to valve seat 450 by ribs 456 is a valve stem 458. Associated with valve stem 458 is a head portion 460 having a sealing surface 462, typically formed of rubber, which is arranged for selectable sealing engagement with a valve seat surface 464 defined on valve seat 450.

A biasing spring 466 is seated between collar member 454 and a spring seat 468 fixedly associated with stem 458 for normally maintaining the head portion 460 in sealing engagement with sealing surface 462, such that the valve is normally closed, in the absence of inlet fluid flow therethrough, as illustrated in FIG. 12.

FIG. 13 illustrates the manifold apparatus of FIG. 12 when fluid flow of at least a threshold volume overcomes the spring force of spring 466 and opens the valve.

It will be appreciated by persons skilled in the art that the invention is not limited to the location of one-way valves in inlet conduits of manifolds and applies equally to the location of one-way valves in outlet conduits of manifolds or in more than one conduit of a manifold.

It will be appreciated by persons skilled in the art that the present invention is not limited to what has been particularly shown and described herein and is applicable for any suitable type of filter element. The scope of the invention is defined only by the claims which follow.

I claim:
1. A fluid filter comprising:
a housing;
a central aperture formed in the bottom of said housing;
a filter element rotatably mounted in said housing and arranged to receive a flow of fluid to be filtered fraom an upstream side of said element to a downstream side thereof;

a fluid inlet arranged to receive a flow of fluid to be filtered;

a fluid outlet arranged to receive a flow of fluid from a downstream side of said filter element;

a fluid inlet and outlet manifold threadably and sealingly joined to said housing in fluid communication with said central aperture, for providing fluid inlet communication through said central aperture from said fluid inlet and for providing fluid outlet communication through said central aperture to said fluid outlet, said fluid inlet and outlet manifold and said central aperture together defining first and second generally coaxial volumes, said first coaxial volume fluidly communicating between said fluid inlet and said upstream side of said filter element and said second coaxial volume fluidly communicating between said downstream side of said filter element and said fluid outlet, and means for causing disengagement of filter aid material associated with said upstream side of said filter element so as to enable regeneration of said filter aid material.

2. A fluid filter according to claim 1 and wherein said means for causing disengagement comprises means for producing rotation of said filter element.

3. A fluid filter according to claim 1 and wherein said means for causing disengagement comprises means for impacting said filter element.

4. A filter according to claim 1 and wherein said first coaxial volume surrounds said second coaxial volume.

5. A filter according to claim 1 and also comprising fluid distributor means fluidly communicating with said first coaxial volume.

6. A filter according to claim 1 and wherein said filter element comprises a central portion and at least one outwardly extending portion.

7. A filter according to claim 6 and also comprising an outlet pipe fluidly communicating between the downstream side of said filter element and said second coaxial volume.

8. A filter according to claim 7 and wherein said filter element is rotatably supported onto said outlet pipe.

9. A filter according to claim 8 and wherein said filter element defines a circular peripheral positioning shoulder which serves to center the filter element about the outlet pipe.

* * * * *